US006229805B1

(12) United States Patent
Linton (10) Patent No.: US 6,229,805 B1
(45) Date of Patent: May 8, 2001

(54) MIXED FULL-RATE AND SUB-RATE SWITCHING

(75) Inventor: Charles C. Linton, Southborough, MA (US)

(73) Assignee: Natural MicroSystems, Framingham, MA (US)

( * ) Notice: Subject to any disclaimer, the term of this patent is extended or adjusted under 35 U.S.C. 154(b) by 0 days.

(21) Appl. No.: 08/895,961

(22) Filed: Jul. 17, 1997

(51) Int. Cl.[7] ................................................. H04L 12/50
(52) U.S. Cl. .............................. 370/358; 370/540
(58) Field of Search ..................... 370/358, 359, 370/360, 379, 468, 540; 395/891

(56) References Cited

U.S. PATENT DOCUMENTS

| | | | | |
|---|---|---|---|---|
| 4,012,596 | * | 3/1977 | West, Jr. et al. | 179/41 |
| 5,420,854 | * | 5/1995 | Hiraiwa | 370/359 |
| 5,784,369 | * | 7/1998 | ROmiti et al. | 370/358 |
| 5,832,310 | * | 11/1998 | Morrissey et al. | 395/891 |

OTHER PUBLICATIONS

Research Report/Patent Search/Jun. 12, 1997.
Research Report/Literature Search/Jun. 12, 1997.
Research Report/Patent Search/Jun. 13, 1997.
Research Report/Literature Search/Jun. 13, 1997.
MT8980D Digital Switch, Mitel Corporation, Nov. 1989.

* cited by examiner

Primary Examiner—Chau Nguyen
Assistant Examiner—Alexander Boakye
(74) Attorney, Agent, or Firm—Mintz, Levin, Cohn, Ferris, Glovsky and Popeo, P.C.

(57) ABSTRACT

A communication switching station includes a digital switch and a sub-rate interface circuit. The switch has signal terminals including inputs and outputs, and switching circuitry, adapted to operate at a first rate, operatively connected between the inputs and outputs. The sub-rate interface circuit includes a first signal terminal operatively connected to at least one of the signal terminals of the first signal terminal and the second signal terminal, the programmable circuitry being operative at a second rate that is lower than the first rate.

14 Claims, 8 Drawing Sheets

MIXED FULL-RATE AND SUB-RATE SWITCHING

FIELD OF THE INVENTION

This invention relates to systems for switching time-multiplexed communication channels at different rates.

BACKGROUND OF THE INVENTION

Figure 1:
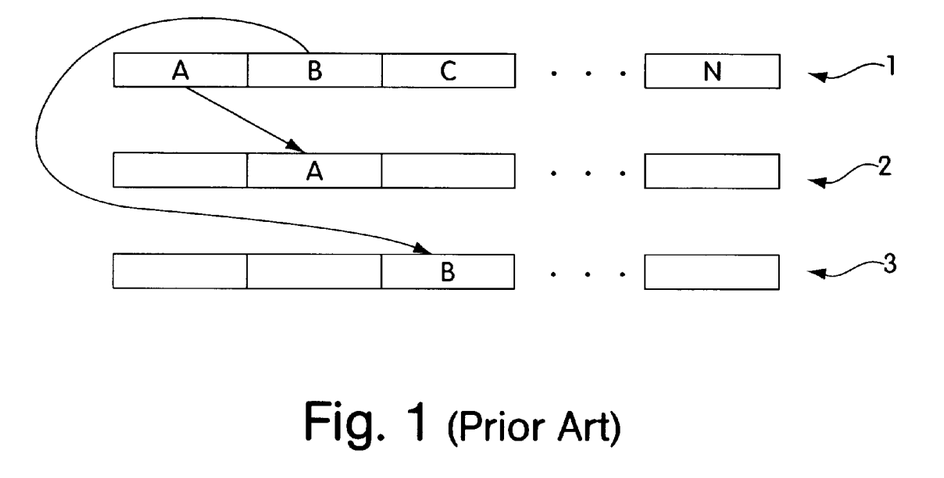
FIG. 1 is a signal diagram illustrating prior art switching of time-multiplexed signals.
Figure 2:
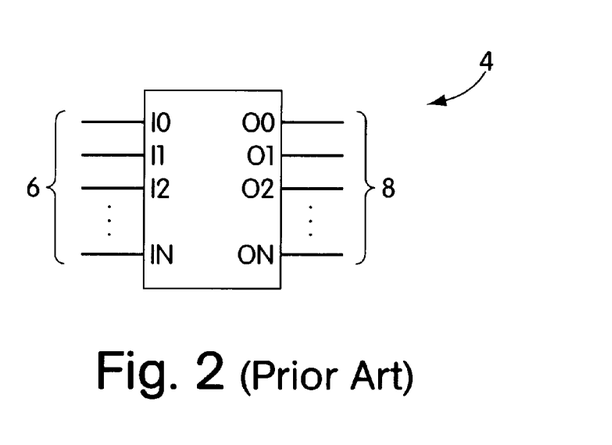
FIG. 2 is a block diagram of an illustrative prior art digital switch.

Referring to FIGS. 1 and 2, typical modem telephone systems use a digital switch 4 to switch calls from one time-multiplexed channel onto several others. For example, time slots A and B from two different telephone calls may have been time-multiplexed onto a single input channel 1, but are destined for different output at channels 2 and 3. The digital switch completes a connection by transferring the signal portions A and B received from the particular time slots in the input channel 1 to specific time slots in the different output channels 2 and 3.

A digital switch generally performs its switching operations by temporarily storing data samples received on one of its input channels I0-IN and then distributing them to its output channels O0-ON. To keep up with the demands of switching between a certain number of input channels 6 and a certain number of input channels 8 at a particular rate, a switch should include a sufficient amount of computational resources, such as switching circuitry, data paths, and temporary storage. The switching rate is often a standard rate, but there are a variety of such rates in use. Voice-over-Internet systems, for example, often employ vocorders, which translate between so-called "full-rate" (64 kbps) audio telephone channels and "sub-rate" channels in which the audio data has been compressed to a fraction of the full rate.

A switch that supports sub-rate switching for a given number of channels is substantially more expensive than one that supports only full-rate switching. This is because resources within the switch are required on a per connection basis, and a switch supporting sub-rate switching must support far more connections. For example, a non-blocking switch supporting 1024 full-rate channels must support 1024 connections. But if the same switch also supported 8 kbps sub-rate channels, it would have to support 8096 connections.

Switches supporting such high connection densities are necessary in dedicated sub-rate systems, but they may be wasted in systems with mixed requirements. Although in very large systems it is possible to mix full-rate and sub-rate switches, smaller systems may present more difficult design choices. And the choices involved in systems tailored for specialized interface applications may be particularly problematic.

SUMMARY OF THE INVENTION

In one general aspect, the invention features a communications switching station that includes a digital switch and a sub-rate interface circuit. The switch has signal terminals including inputs and outputs, and switching circuitry adapted to operate at a first rate operatively connected between the inputs and the outputs. The sub-rate interface circuit includes a first signal terminal operatively connected to at least one of the signal terminals of the digital switch, a second signal terminal, and programmable circuitry connected between the first signal terminal and the second signal terminal, the programmable circuitry being operative at a second rate, which is lower than the first rate.

In preferred embodiments, a plurality of jumpers can bypass the sub-rate interface circuit; the programmable circuitry of the sub-rate interface circuit includes at least one packing circuit, such as a packer or unpacker, operatively connected between the two terminals of the sub-rate interface circuit, and the second terminal is for connection to external signal channels operating at the second rate; the sub-rate interface circuit includes at least a third signal terminal operatively connected to at least one of the signal terminals of the digital switch and at least a fourth signal terminal for connection to external signal channels operating at the second rate, and the sub-rate interface circuit includes further programmable circuitry connected between the third signal terminal and the fourth signal terminal; the second and third signal terminals of the interface circuit are inputs, the first and fourth signal terminals of the interface circuit are outputs, and the interface circuit includes an unpacker operatively connected between the first signal terminal of the interface circuit and the second signal terminal of the interface circuit, and a packer operatively connected between the second signal terminal of the interface circuit and the first signal terminal of the interface circuit; the second signal terminal of the interface circuit is operatively connected to one of the signal terminals of the digital switch, and a packing circuit is operatively connected between the first and second terminals of the interface circuit; the second signal terminal of the interface circuit is operatively connected to one of the signal terminals of the digital switch, and the station further includes a further plurality of signal terminals operatively connected to a plurality of the signal terminals of the digital switch; packing circuits are each operatively connected between two of the terminals of the interface circuit; the packing circuits include at least a packer and an unpacker; and the programmable circuitry in the sub-rate interface circuit includes field-programamble logic, such as an electrically programmable logic device.

In another general aspect, the invention features a communications switching station that includes a digital switch and a sub-rate interface circuit. The switch has signal terminals including inputs and outputs, and switching circuitry adapted to operate at a first rate operatively connected between the inputs and the outputs. The sub-rate interface circuit includes a first signal terminal operatively connected to at least one of the signal terminals of the digital switch, a second signal terminal, and a packing circuit connected between the first signal terminal and the second signal terminal, the packing circuit being operative at a second rate, which is lower than the first rate.

In a further aspect, the invention features a communications switching method that includes communicating with sub-rate streams, converting between packed sub-rate and sparse full-rate streams, and switching the sparse channels. The step of communicating can receive sub-rate streams and the step of converting can unpack the sub-rate streams. The method can also include the step of packing the switched sparse streams to obtain packed sub-rate streams and further the step of sending the packed sub-rate streams. The switching can be performed by a full-rate switch.

The invention is advantageous in that it permits a versatile handling of mixtures of sub-rate and full-rate communications. By providing a variable mixture of sub-rate and full-rate channels, systems requiring some sub-rate capability can be accommodated, without requiring the expense of full sub-rate capabilities. And by governing the configuration of sub-rate capabilities with programmable logic, the exact nature of the communications mix can be finely tailored to fit a specific application.

DETAILED DESCRIPTION OF AN ILLUSTRATIVE EMBODIMENT

Figure 3:
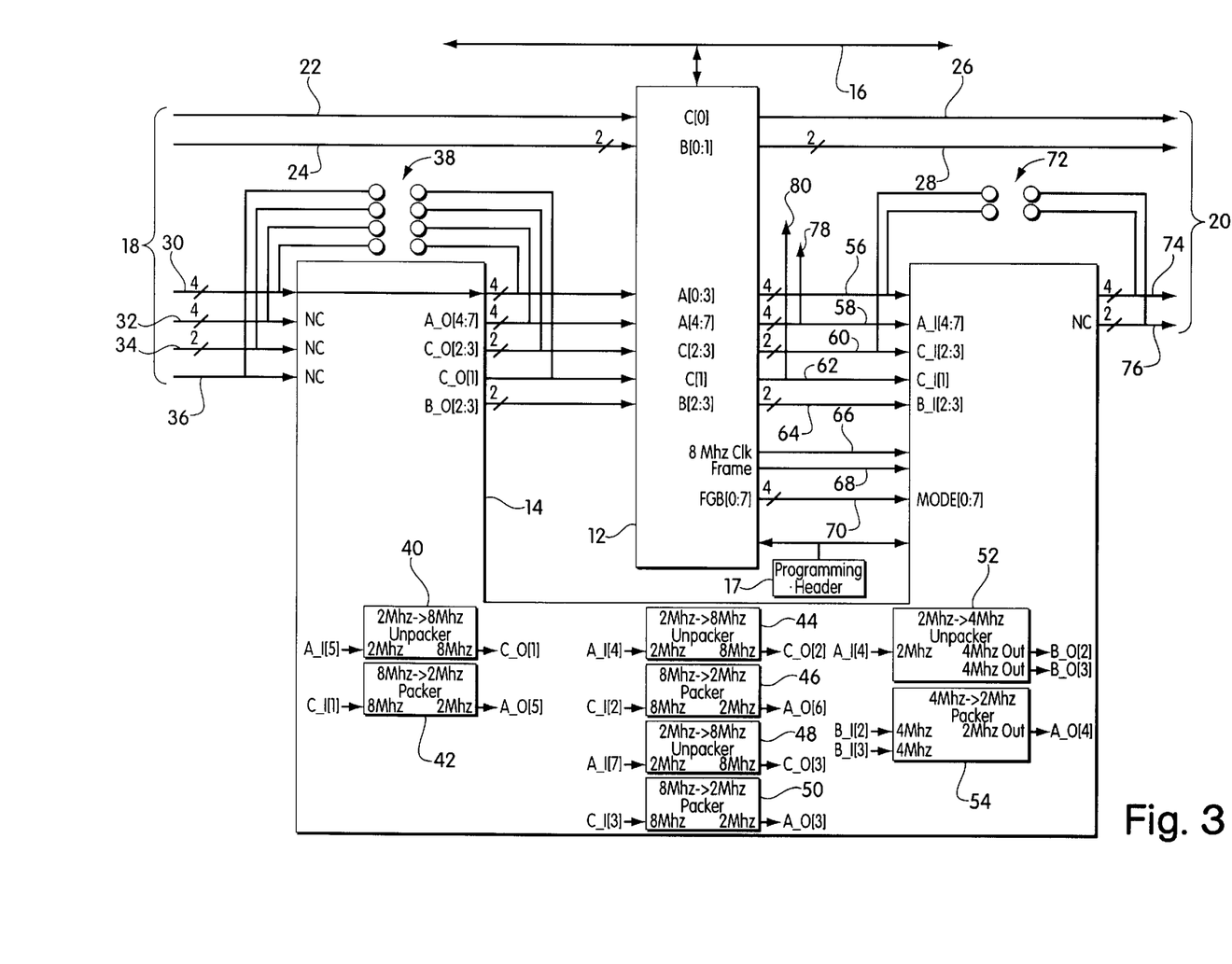
FIG. 3 is a programmable full-rate/sub-rate switch according to the invention, shown programmed in a first configuration.

Referring to FIG. 3, an illustrative programmable sub-rate/full-rate digital switch 10 includes a full-rate digital switch 12, and a programmable logic element 14 made up of one or more Programmable Logic Devices (PLD's), such as Electrically Programmable Logic Devices (EPLD's). These two circuit elements receive a series of incoming signal lines 18, which carry signals of different rates. The programmable sub-rate/full-rate switch receives configuration commands from a central processor on a processor bus (not shown), and provides switching between the incoming signal lines and a series of output signal lines 20. As it is shown in FIG. 1, the switch is set up to switch various streams between a Digital Signal Processing (DSP) processor, a data communications interface (datacom), a full-rate quad T1/E1 interface circuit, and an optional daughter card. In addition, bidirectional circuit-switched time division multiplexed (TDM standard) streams can be bussed from the switch to other switches in the system via a TDM bus 16. The exact digital switch configuration is not critical, and other types of digital switches with different capabilities and in different environments can also benefit from the invention.

The digital switch 12 is a programmable full-rate switch. It is structured to process three types of full-rate stream groups labeled A[0:7], B[0:3], and C[0:3] at the speeds listed in table 1.

TABLE 1

| Stream Group | Speed | Time slots per Stream |
|---|---|---|
| A | 2Mhz | 32 |
| B | 4Mhz | 64 |
| C | 8Mhz | 128 |

A first input signal line 22 provides an 8 Mhz communication signal containing 128 eight-bit time slots to stream C[0], which can originate from the DSP processor. A pair of input signal lines 24 provide two 4 Mhz streams to streams B[0:1], which can originate from the datacom. The digital full-rate switch puts out an 8 Mhz output stream at a first output 26 (e.g., return path to the DSP processor) and two 4 Mhz output streams at a pair of outputs 28 (e.g., a return path to the datacom). Without more, these connections to the switch allow it to provide simple full-rate switching between these streams.

In one embodiment, the programmable logic element 14 is an optional accessory to a full-rate capable system. If it is not used, four groups of input streams 30, 32, 34, 36 are directly routed respectively to third, fourth, fifth, and sixth input groups of the full-rate digital switch 12 via a bank of jumpers 38. The four streams include two groups of four 2 Mhz streams 30, 32 (e.g., T1/E1 PCM & SIG), a group of two 8 Mhz streams 34 (e.g., from a daughter card), and an 8 Mhz stream 36 (e.g., from the DSP processors). When jumpers are in place, these streams are respectively provided to local streams A[0:3], A[4:7], C[2:3], and C[1]. When the programmable logic element is installed instead, the streams are routed to the programmable logic element, and four groups of outputs of the programmable logic elements are operatively connected to the third, fourth, fifth, and sixth groups of inputs of the digital switch. Stream B[2:3] is connected to the daughter card. The daughter card can perform specialized functions, such as voice recognition, and its capabilities form no part of the present invention.

In a first configuration, which is presented in FIG. 3, the programmable logic device 14 is configured to provide a series of packers and unpackers connected in a series configuration with respect to the digital switch 12. Specifically, the programmable logic device provides first, second, and third 2 Mhz-to-8 Mhz unpackers 40, 44, and 48; first, second, and third 8 Mhz-to-2 Mhz packers 42, 46, and 50; a 2 Mhz-to-4 Mhz unpacker 52; and a 4 Mhz-to-2 Mhz packer 54. The unpackers have inputs operatively connected to the input streams and outputs operatively connected to inputs of the switch. The packers have inputs operatively connected to outputs of the digital switch and outputs which act as system outputs. The packers and unpackers are circuits which can be created within the PLD by closing electrically programmable links at time of manufacture. In field-programmable embodiments the user can reconfigure the system under control of a programming header 17.

The programmable logic element 14 also receives a series of outputs from the digital switch 12. These include a first 2 Mhz stream 56 (e.g., T1/E1 PCM), a second 2 Mhz stream 58 (e.g., T1/E1 SIG data), a first 8 Mhz stream 60 (e.g., to the daughter card), a second 8 Mhz stream 62 (e.g., to the DSP processor), and a third 8 Mhz stream 64. The full-frame digital switch also provides an 8 Mhz clock signal 66 and a frame signal 68 to the programmable logic device. An eight-bit FGB signal 70 is further provided to mode input lines of the programmable logic device. These mode lines relay control signals from the processor bus to the programmable logic element through the digital switch. It should be again emphasized that the exact connections shown in FIG. 3 are not a requirement, and that other types of communications configurations can also benefit from the invention.

Generally, sub-rate logic is implemented by using "sparse" full-rate channels (i.e., full-rate time slots which hold only a single sub-rate channel) and implementing logic blocks which work as sub-rate packers and unpackers. The packers take sparse channels and combine them into a full-rate channel. The unpackers each take a full-rate channel containing multiple sub-rate channels and unpack it into sparse full-rate channels. This approach allows the application controlling the switch to always address and switch full-rate channels, which may be either packed or sparse.

The packer and unpacker sub-rate logic blocks can be designed for operation at rates of 32 kbps, 16 kbps, or 8 kbps in this embodiment. The sub-rate logic blocks can also be designed as logical local resources independent of other streams or devices. Used in this way, the application controlling the system can make switching calls to connect an input full-rate packed channel to an unpacker before independently switching the resulting sparse channels to their destinations.

Figure 6:
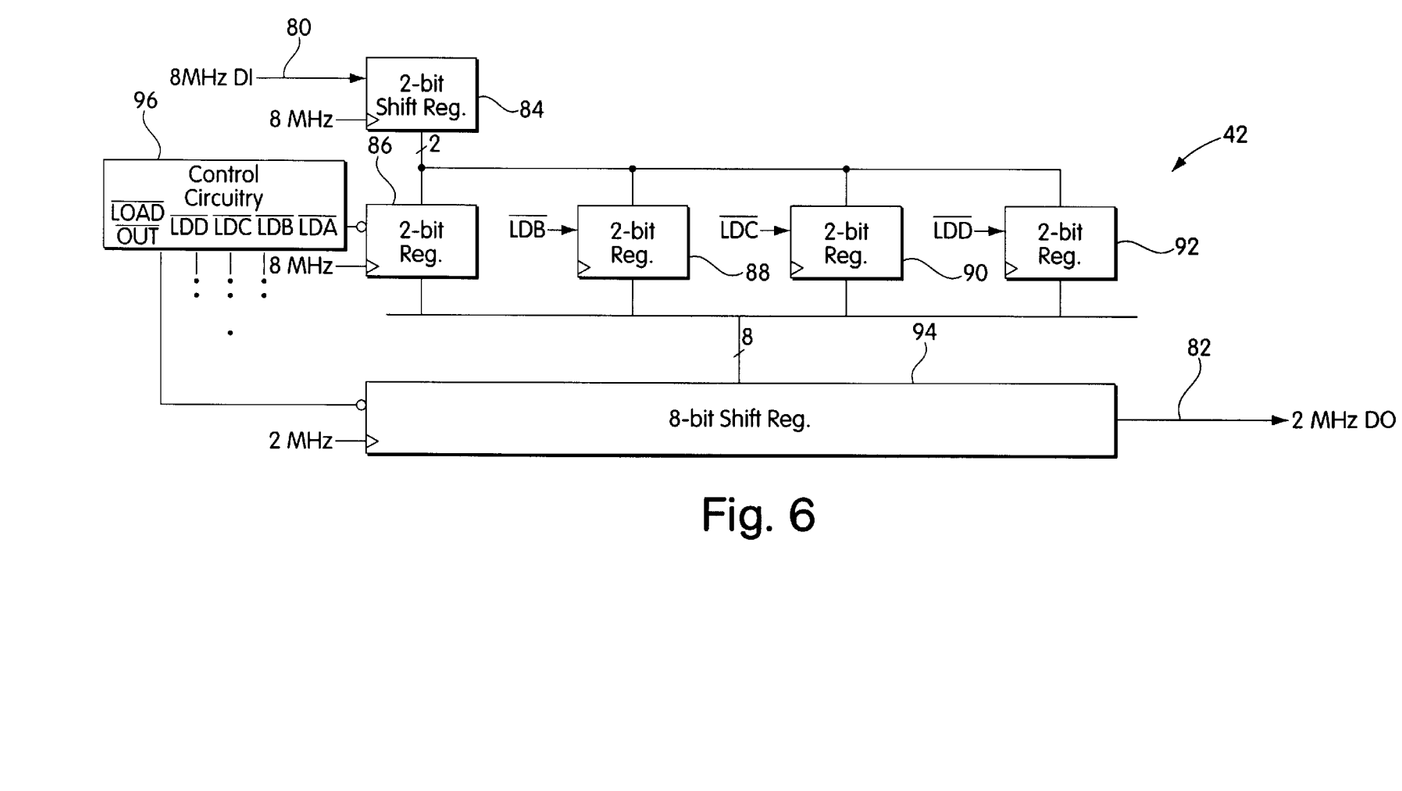
FIG. 6 is a block diagram of a packer implemented with the programmable full-rate/sub-rate switch of FIG. 3.

Referring to FIG. 6, the first packer 42 has a full-rate data input 80 and a sub-rate data output 82. The data input is operatively connected to a first two-bit shift register 84, which is clocked at the speed of the input stream (e.g., 8 Mhz). The first two-bit shift register has a parallel output operatively connected to parallel load inputs of first, second, third, and fourth two-bit registers 86, 88, 90 and 92.

The first two-bit register 86 has a parallel output operatively connected to the two least significant bits of a parallel input of an eight-bit shift register 94. The second two-bit register has two parallel outputs operatively connected to the two next-least significant bits of the eight-bit shift register. The third two-bit register 90 has two parallel outputs operatively connected to the next-least significant bits of the eight-bit shift register, and the fourth two-bit register 92 has two parallel outputs operatively connected to the two most significant parallel inputs of the eight-bit shift register. The eight-bit shift register is clocked at the speed of the output stream (e.g., 2 Mhz), and its output acts as the data output of the packer. The packer also includes control circuitry 96, which has a series of load control outputs $\overline{\text{LDA}}, \overline{\text{LDB}}, \overline{\text{LDC}}, \overline{\text{LDD}}$, and $\overline{\text{LOAD OUT}}$, which are respectively provided to load control inputs of the first two-bit register, the second two-bit register, the third two-bit register, the fourth two-bit register, and the eight-bit shift register.

Of course, other packer configurations are also possible. Using different register widths and clock rates, the different packers shown in FIG. 3 can be implemented, as can any number of others. It may also be possible to devise other suitable packer architectures.

Figure 7:
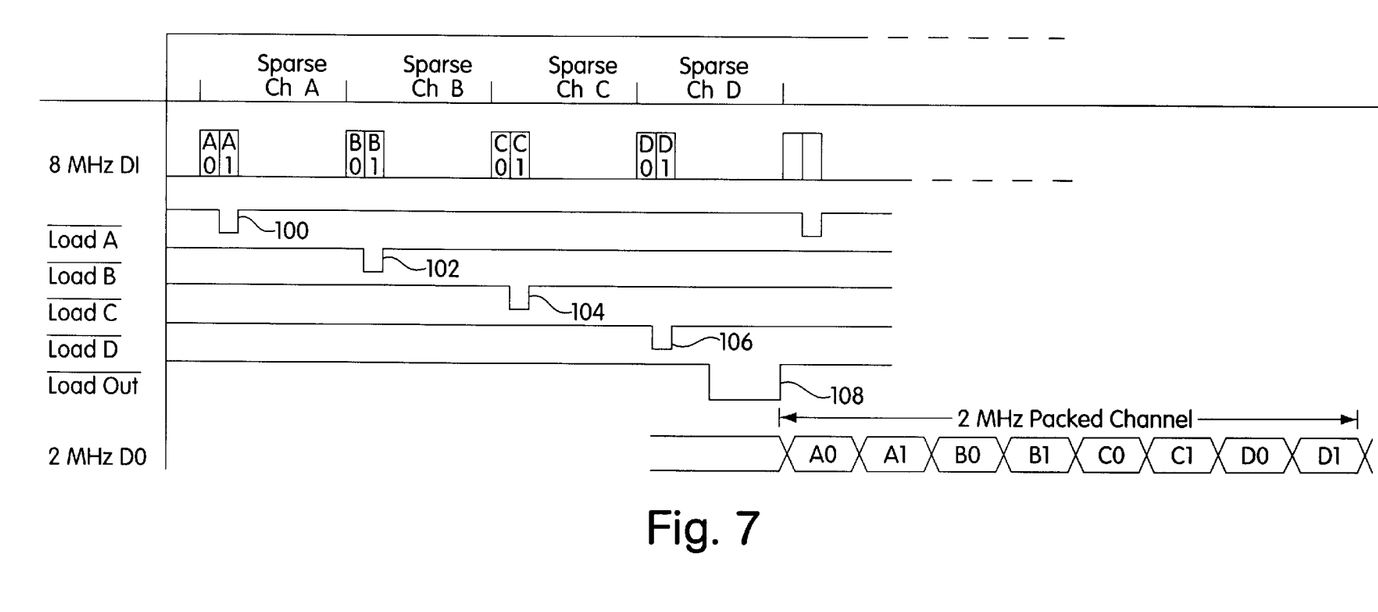
FIG. 7 is a signal timing diagram illustrating the operation of the packer of FIG. 6.

In operation, referring to FIGS. 6 and 7, the two-bit shift register 84 continuously holds the two most recent bits from the input data stream provided on the packer's data input line 80. After the first two bits of the input data stream A0, A1 have entered the two-bit shift register, the control circuitry 96 provides a first load pulse 100 on its first load output $\overline{\text{LDA}}$. This loads the first two bits of the data stream into the first two-bit register 86. Since the input data stream received on a data input 80 is a sparse stream, no further meaningful data is received for the rest of the first full-rate channel's time slot.

At the beginning of the second full-rate time slot, the two-bit shift register 84 will receive the first two bits B0, B1 of a second sparse channel. The control circuitry 96 provides a second load pulse 102 on its second load output LDB_ causing the second two-bit register 88 to load these two bits into the second two-bit register 88. Similarly, the control circuitry provides third and fourth load pulses 104, 106 on its third and fourth load outputs $\overline{\text{LDC}}, \overline{\text{LDB}}$ to load the first two bits C0, C1 of the third sparse channel into the third register 90 and to load the first two bits D0, D1 of the fourth sparse channel into the fourth two-bit register 92.

When all of the two-bit registers have been loaded, the control circuitry provides a fifth load pulse 124 on its fifth load output $\overline{\text{LOAD OUT}}$ to load their contents into the eight-bit shift register 94. This shift register then successively transmits the first two bits of the first sparse channel A0, A1, the first two bits of the second sparse channel B0, B1, the first two bits of the third sparse channel C0, C1, and the first two bits of the fourth sparse channel D0, D1 onto the data output line 82. This eight-bit output constitutes a packed channel.

Figure 8:
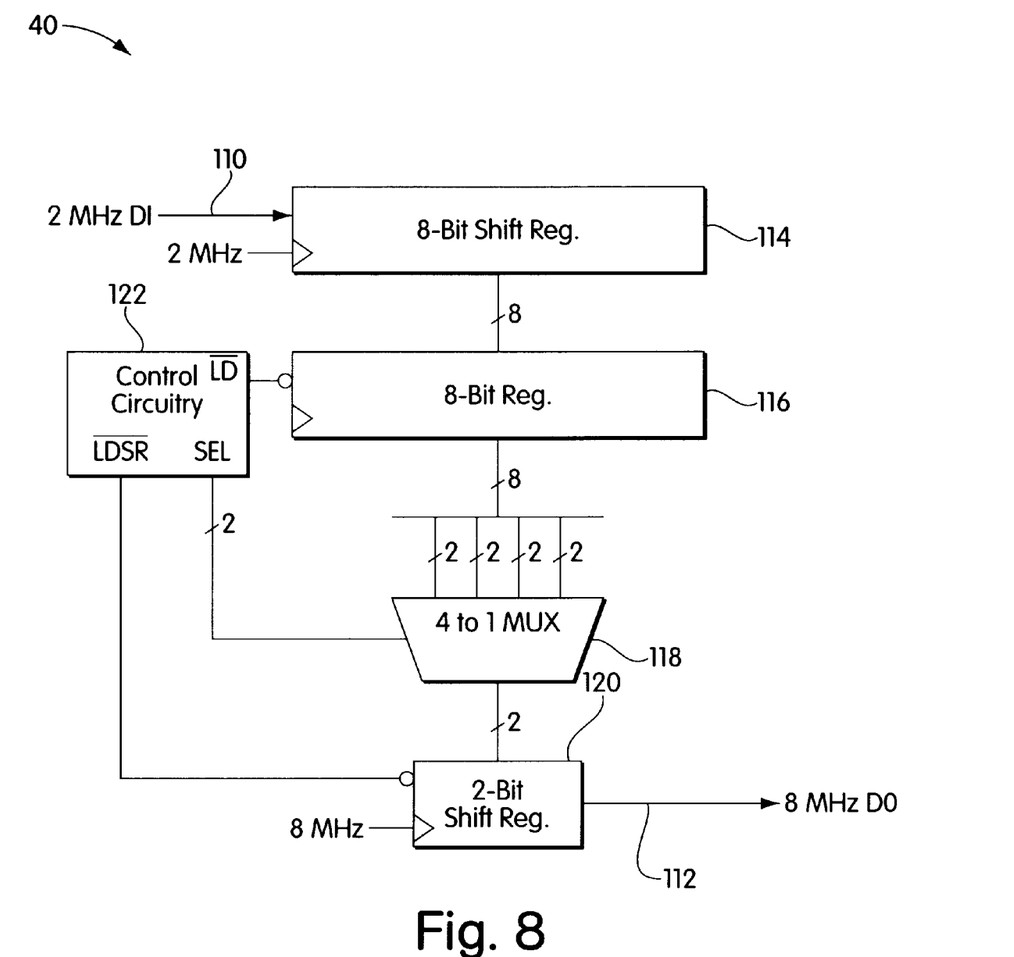
FIG. 8 is a block diagram of an unpacker implemented with the programmable full-rate/sub-rate switch of FIG. 3.

Referring to FIG. 8, the first unpacker 40 receives a packed sub-rate data stream at a data input 110 and provides a sparse full-rate data stream on a data output 112. An eight-bit shift register 114 has a serial input operatively connected to the data input and an eight-bit wide parallel output operatively connected to a parallel load input of an eight-bit register 116. The eight-bit register has an eight-bit wide parallel output, which is operatively connected to the inputs of a 4-to-1 multiplexer 118. The two least significant bits of the parallel output of the eight-bit register are operatively connected to a first input of the multiplexer, the two next-least significant bits of the register are operatively connected to a second input of the multiplexer, the two next-least significant bits are provided to a third input of the multiplexer, and the two most significant bits are provided to a fourth input of the multiplexer. The multiplexer has a parallel output operatively connected to a parallel load input of a two-bit shift register 120.

The unpacker 40 also includes control circuitry 122. The control circuitry has a load control output $\overline{\text{LD}}$ operatively connected to a parallel load control input of the eight-bit register 116, a two-bit select output provided to a select input of the multiplexer 118, and shift register load control output $\overline{\text{LDSR}}$ operatively connected to a parallel load input of the two-bit shift register 120. As with the unpacker, the packer can be implemented in a variety of different ways. The architecture presented in FIG. 8 can be adjusted to interface different pairs of rates, by adjusting register and multiplexer widths, and by changing the sequencing of the control signals. Other architectures may also be devised to achieve the unpacking functionality described.

Figure 9:
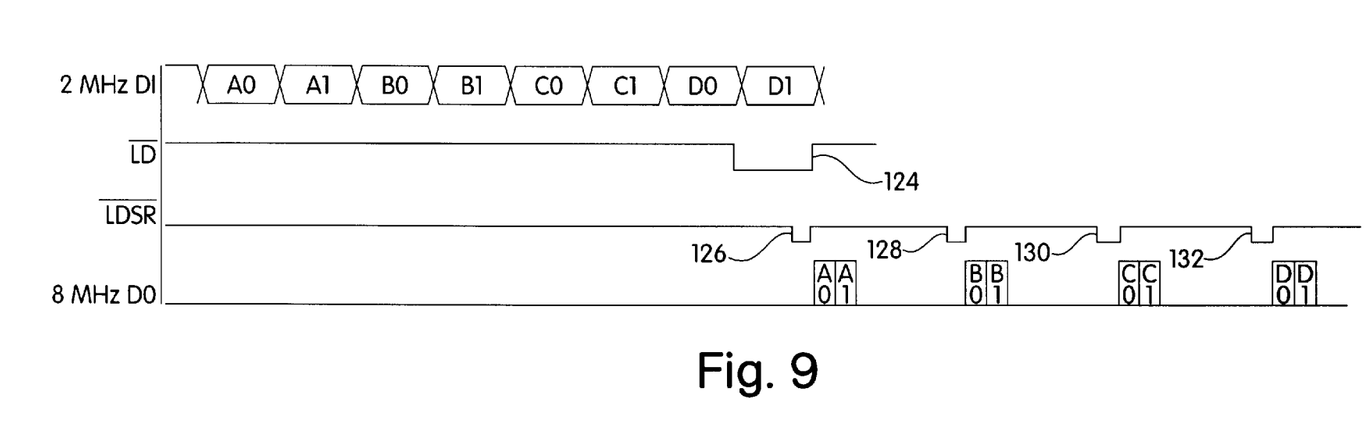
FIG. 9 is a signal timing diagram illustrating the operation of the unpacker of FIG. 8.

In operation, referring to FIGS. 8 and 9, the eight-bit shift register receives data from the packed sub-rate channel as a packed series of bits for different channels. It shifts in two bits for the first channel A0, A1, two bits for the second channel B0, B1, two bits for the third channel C0, C1, and two bits for the fourth channel D0, D1. Once the eight-bit shift register has received the complete packed sub-rate channel, the control circuitry 122 issues a load signal on its load line LD_, which causes the eight-bit register 116 to load the bits from the four sub-rate channels. The control circuitry then selects the first input of the multiplexer 118 and issues a first pulse 126 on its shift register load line $\overline{\text{LDSR}}$ to load the first and second bits from the first channel A0, A1 onto the output stream. Since the output channel is a sparse channel, the control circuitry then waits until the beginning of the second full-rate channel time slot to provide a second pulse 128 on its shift register load line $\overline{\text{LDSR}}$, which causes the two-bit shift register to load the first and second bits of the second channel B0, B1 onto the output data stream. Similarly, the control circuitry issues appropriately timed third and fourth shift register load pulses 130, 132 to load the first and second bits C0, C1 of the third channel and the first and second bits D0, D1 of the fourth channel onto the data output 112.

Referring again to FIG. 3, the serial configuration of the full-rate sub-rate switch 10 can accommodate a variety of different switching requirements. For example, the programmable logic element 14 may receive a packed input channel and unpack it using one of the unpackers, and the digital switch 12 can then switch the individual channels on this unpacked signal to unpacked output channels. These output channels can then be packed by the unpackers and provided as packed output channels or they can be otherwise processed.

Figure 4:
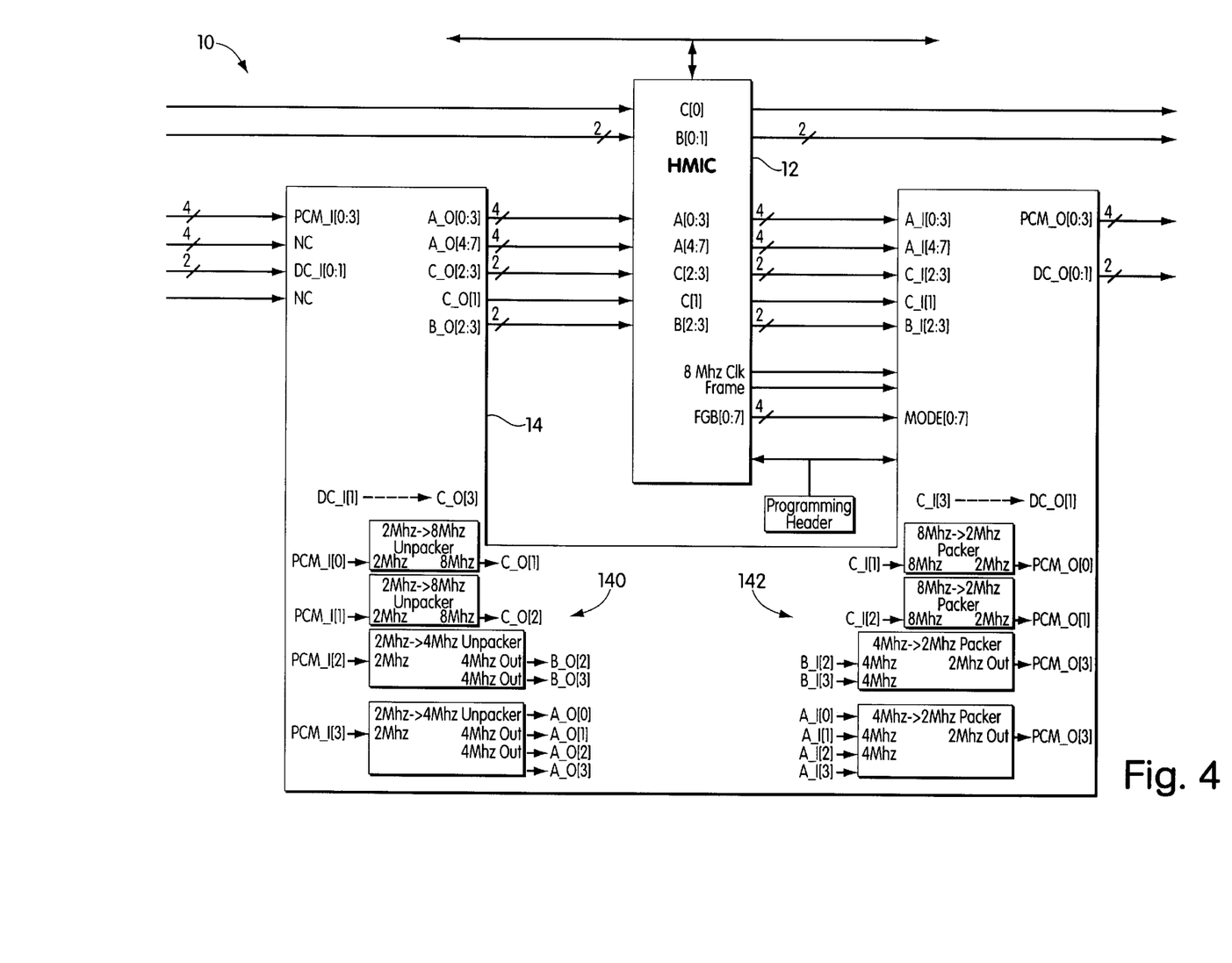
FIG. 4 is the programmable full-rate/sub-rate switch of FIG. 3, shown programmed in a second configuration.

Referring to FIG. 4, the programmable logic element 14 can also be reconfigured to provide different sets of unpackers 140 and packers 142 in a parallel configuration. In the parallel configuration, the packers and unpackers both have inputs operatively connected to outputs of the digital switch. They also each have outputs operatively connected to inputs of the digital switch. The parallel configuration can permit a packed sub-rate channel to be first switched by the digital switch 12 and then unpacked by one of the unpackers. The unpacked streams can then again be switched by the digital switch, and the results can be packed using one of the packers. This approach is very flexible, but it can introduce delay, which can present problems in some applications. It may also be feasable to combine the serial and parallel approaches illustrated in FIGS. 3 and 4 to achieve a particular objective.

Figure 5:
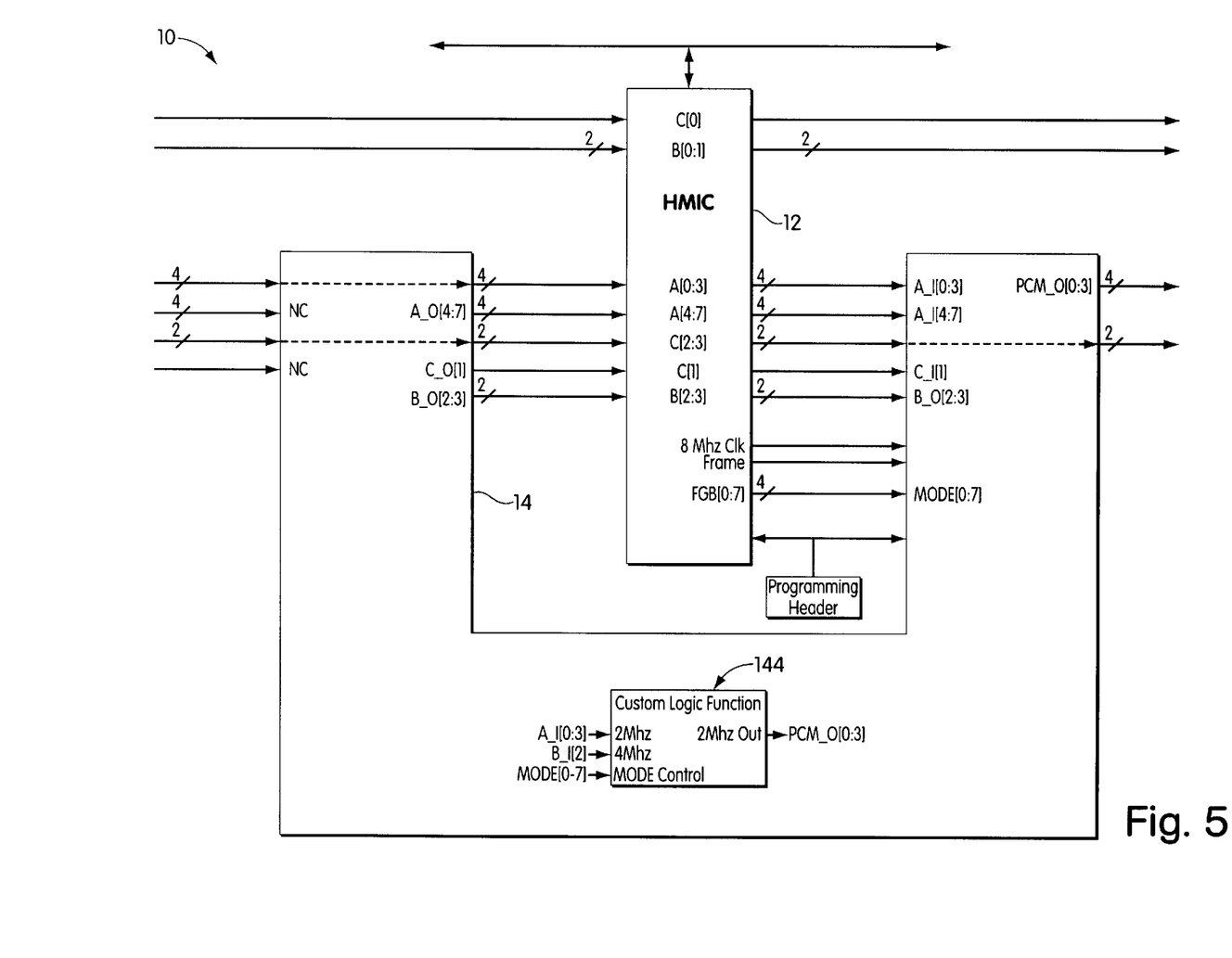
FIG. 5 is the programmable full-rate/sub-rate switch of FIG. 3, shown programmed in a third configuration.

Referring to FIG. 5, it is also possible to implement any arbitrary custom logic function 144 that the programmable logic element will support. These logic functions can provide a variety of custom communication features to the switch 10, without drastically increasing the cost of the switch. For example, in certain applications some sub-rate switching may be quite delay-sensitive, and these kinds of streams can be handled by dedicated switching configured into the programmable logic device. It may also be possible to design logic functions that allow for switching of some sub-rate channels while leaving others alone. The nature of the specific communications mix to be addressed by the specific application will dictate the exact logic function to be implemented.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto.

What is claimed is:

1. A communications switching station, comprising:
    a digital switch comprising:
        a plurality of signal terminals including a plurality of inputs and a plurality of outputs, and
        switching circuitry adapted to operate at a first rate operatively connected between the inputs and the outputs, and
    a sub-rate interface circuit including
        a first signal terminal operatively connected to at least one of the signal terminals of the digital switch,
        a second signal terminal,
        programmable circuitry connected between the first signal terminal and the second signal terminal, the programmable circuitry being operative at a second rate, the second rate being lower than the first rate,
        at least a third signal terminal operatively connected to at least one of the signal terminals of the digital switch,
        at least a fourth signal terminal for connection to external signal channels operating at the second rate, and
        further programmable circuitry connected between the third signal terminal and the fourth signal terminal.

2. The station of claim 1 wherein the second and third signal terminals of the interface circuit are inputs, the first and fourth signal terminals of the interface circuit are outputs, and wherein the interface circuit includes an unpacker operatively connected between the first signal terminal of the interface circuit and the second signal terminal of the interface circuit, and a packer operatively connected between the second signal terminal of the interface circuit and the first signal terminal of the interface circuit.

3. The station of claim 1 further including a plurality of jumpers for bypassing the sub-rate interface circuit.

4. The communications switching station of claim 1 wherein the programmable circuitry comprises
    a packing circuit operative at the second rate, and
    the communications system further comprises at least one jumper for bypassing the sub-rate interface circuit.

5. A communications switching station, comprising:
    a digital switch comprising:
        a plurality of signal terminals including a plurality of inputs and a plurality of outputs, and
        switching circuitry adapted to operate at a first rate operatively connected between the inputs and the outputs, and
    a sub-rate interface circuit including
        a first signal terminal operatively connected to at least one of the signal terminals of the digital switch,
        a second signal terminal operatively connected to one of the signal terminals of the digital switch,
        programmable circuitry connected between the first signal terminal and the second signal terminal, the programmable circuitry being operative at a second rate, the second rate being lower than the first rate, and
        a further plurality of signal terminals operatively connected to a plurality of the signal terminals of the digital switch.

6. The station of claim 5 wherein a plurality of packing circuits are each operatively connected between two of the terminals of the interface circuit.

7. The station of claim 6 wherein the packing circuits include at least a packer and an unpacker.

8. The communications switching station of claim 5 further comprising
    at least one jumper for bypassing the sub-rate interface circuit.

9. A communications switching station, comprising:
    a digital switch comprising:
        a plurality of signal terminals including a plurality of inputs and a plurality of outputs, and
        switching circuitry adapted to operate at a first rate operatively connected between the inputs and the outputs, and
    a sub-rate interface circuit including
        a first signal terminal operatively connected to at least one of the signal terminals of the digital switch,
        a second signal terminal,
        a first packing circuit connected between the first signal terminal and the second signal terminal, the packing circuit being operative at a second rate, the second rate being lower than the first rate,
        at least a third signal terminal operatively connected to at least one of the signal terminals of the digital switch,
        at least a fourth signal terminal for connection to external signal channels operating at the second rate, and
        a second packing circuit connected between the third signal terminal and the fourth signal terminal.

10. The station of claim 9 wherein the second and third signal terminals of the interface circuit are inputs, the first and fourth signal terminals of the interface circuit are outputs, and wherein the first packing circuit is an unpacker and the second packing circuit is a packer.

11. The station of claim 9 further including a plurality of jumpers for bypassing the sub-rate interface circuit.

12. A communications switching station, comprising:
   a digital switch comprising:
      a plurality of signal terminals including a plurality of inputs and a plurality of outputs, and
      switching circuitry adapted to operate at a first rate operatively connected between the inputs and the outputs, and
   a sub-rate interface circuit including
      a first signal terminal operatively connected to at least one of the signal terminals of the digital switch,
      a second signal terminal operatively connected to one of the signal terminals of the digital switch,
      a first packing circuit connected between the first signal terminal and the second signal terminal, the packing circuit being operative at a second rate, the second rate being lower than the first rate, and
      a further plurality of signal terminals operatively connected to a plurality of the signal terminals of the digital switch.

13. The station of claim 12 wherein a second packing circuit is operatively connected between two of the terminals of the interface circuit.

14. The station of claim 13 wherein the first and second packing circuits include at least a packer and an unpacker.

* * * * *